United States Patent [19]
Nemazie et al.

[11] Patent Number: 6,025,966
[45] Date of Patent: Feb. 15, 2000

[54] DEFECT MANAGEMENT FOR AUTOMATIC TRACK PROCESSING WITHOUT ID FIELD

[75] Inventors: Siamack Nemazie, San Jose, Calif.; John Schadegg, Niwot, Colo.

[73] Assignee: Cirrus Logic, Inc., Fremont, Calif.

[21] Appl. No.: 08/833,142

[22] Filed: Apr. 4, 1997

Related U.S. Application Data

[63] Continuation of application No. 08/397,899, Mar. 3, 1995, abandoned, which is a continuation-in-part of application No. 08/206,096, Mar. 3, 1994, abandoned.

[51] Int. Cl.⁷ .............................. G11B 5/09; G11B 5/596
[52] U.S. Cl. .......................................... 360/53; 360/77.02
[58] Field of Search ............................... 360/53, 135, 63, 360/72.2, 48, 72.1, 54, 49, 77.02, 73.03; 395/442, 500, 182.06, 183.03, 183.18, 183.2; 371/10.2, 21.6, 42; 369/54, 58; 365/185.09; 364/468

[56] References Cited

U.S. PATENT DOCUMENTS

| | | |
|---|---|---|
| 4,209,809 | 6/1980 | Chang et al. . |
| 4,297,737 | 10/1981 | Andresen et al. . |
| 4,498,146 | 2/1985 | Martinez . |
| 4,504,873 | 3/1985 | Bandy et al. . |
| 4,507,693 | 3/1985 | Matsuda et al. . |
| 4,656,532 | 4/1987 | Greenberg et al. . |
| 4,736,341 | 4/1988 | Redmond et al. . |
| 4,814,903 | 3/1989 | Kulakowski ............................. 360/48 |
| 4,827,423 | 5/1989 | Beasley et al. . |
| 4,914,530 | 4/1990 | Graham et al. . |
| 4,924,331 | 5/1990 | Robinson et al. . |
| 4,935,825 | 6/1990 | Worrell et al. . |
| 5,075,804 | 12/1991 | Deyring . |
| 5,111,444 | 5/1992 | Fukushima et al. . |
| 5,172,381 | 12/1992 | Karp et al. . |
| 5,200,864 | 4/1993 | Dunn et al. . |
| 5,200,959 | 4/1993 | Gross et al. . |
| 5,216,655 | 6/1993 | Kearn et al. ............................... 369/58 |
| 5,235,585 | 8/1993 | Bish et al. . |
| 5,245,595 | 9/1993 | Yasurawa ......................... 360/73.03 X |
| 5,255,136 | 10/1993 | Machado et al. . |
| 5,270,877 | 12/1993 | Fukushima et al. . |
| 5,270,979 | 12/1993 | Marari et al. . |
| 5,271,018 | 12/1993 | Chan ..................................... 360/48 X |
| 5,319,627 | 6/1994 | Shinno et al. ........................ 369/32 X |
| 5,367,652 | 11/1994 | Golden et al. ..................... 360/72.1 X |

FOREIGN PATENT DOCUMENTS 58-219658  12/1983  Japan .

*Primary Examiner*—W. Chris Kim
*Attorney, Agent, or Firm*—Haverstock & Associates; Maryam Imam; Dan A. Shifrin

[57] ABSTRACT

A defect management system for use in a data storage system. The defect management system generates a track defect list comprising a sector defect record for each of a set of defective sectors in a track of a media surface. A sector defect record includes defect management information for each of the defective sectors. The defect management information may be generated according to one of several defect management schemes. The apparatus of the present invention stores the track defect list in a buffer or sector headers. The apparatus of the present invention maps a physical sector number to a logical sector number using the track defect list. If the track defect list is stored in sector headers, the present invention may use a ping-pong FIFO for processing the track defect list.

3 Claims, 11 Drawing Sheets

| ID PLO | ID AM | ID... | CRC | GAP | DATA FLO | DAM | DATA | ECC | PAD |

| PLO | SYNC | HEADER | DATA | ECC | PAD |

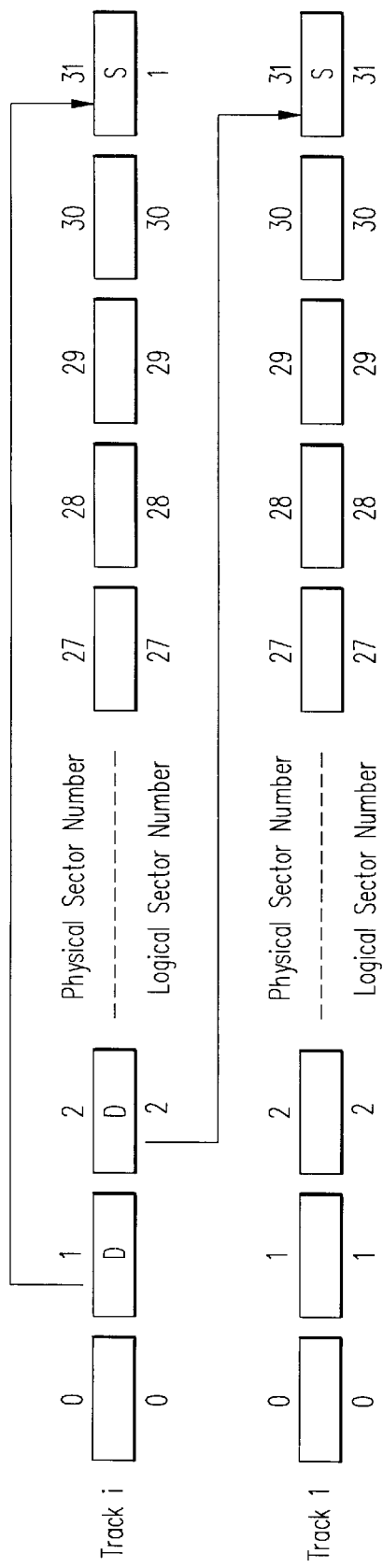
FIG. 3a
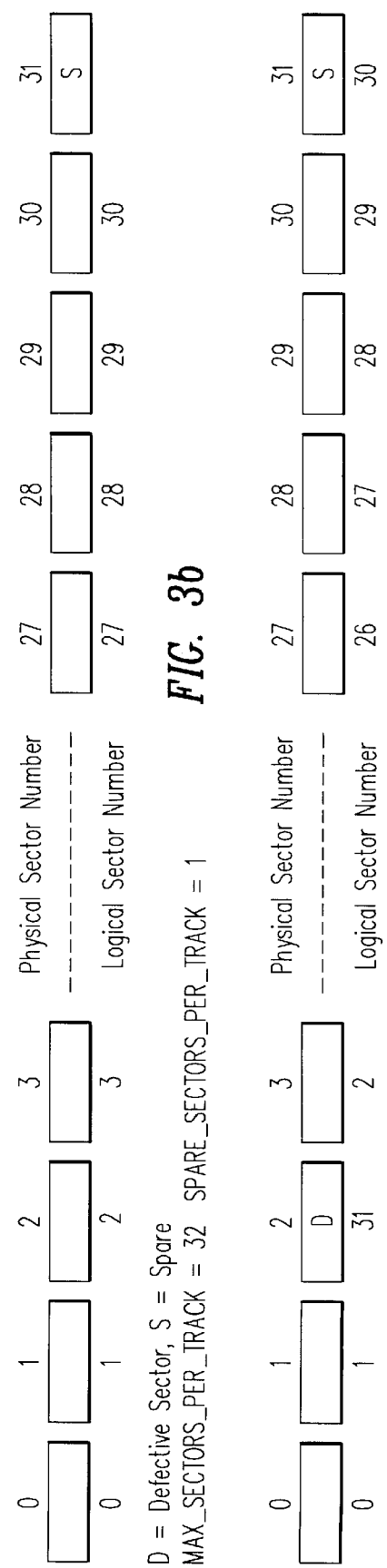
FIG. 3b
FIG. 3c

MAX_SECTORS_PER_TRACK = 32   SPARE_SECTORS_PER_TRACK = 1

DEFECT MANAGEMENT FOR AUTOMATIC TRACK PROCESSING WITHOUT ID FIELD

RELATED APPLICATIONS

This application is a continuation of application Ser. No. 08/397,899, filed Mar. 3, 1995, abandoned which is a continuation-in-part of application Ser. No. 08/206,096, filed Mar. 3, 1994, abandoned.

FIELD OF THE INVENTION

The present invention relates to the control of storage systems for digital computers. More particularly, the present invention relates to a defect management method and apparatus for a rotating media storage system.

BACKGROUND OF THE INVENTION

An example of a magnetic media platter with embedded servo fields is illustrated in FIG. 1. These servo fields may also be referred to as servo bursts or servo marks. Each concentric circle schematically represents one track which is subdivided into multiple sectors and each radial line extending from the center outward, represents a servo field. A servo field contains data which is pre-written on the disk, during manufacturing of the disk, concerning the location of the servo field and the track on the disk for positioning of the read/write head relative to a particular track. The servo fields are then used by the controller for positioning of the read/write head during read and write operations. It is imperative therefore, that the data within the servo fields not be written over. In order not to write over the data within a servo field, the controller must know where the servo fields are and be able to suspend write operations over that area.

The usable regions for storage on the disk are located on the tracks, between the servo fields. Data to be stored on the disk is written in these regions between the servo fields, which will be referred to as a data region. The recording of data within these regions is measured in bits per inch (BPI). Assuming a constant bit density to record a bit, the number of bits which can be recorded between servo fields is much less for the inner circle, track 0, than the number of bits which can be recorded in the outermost circle, track N. Though possible, it is impractical to provide a unique recording and reading speed for each track. In order to take advantage of the higher storage potential of the outer tracks without exceeding the allowable density on the inner tracks, the disk is divided into multiple zones and a method of zone bit recording is used. The tracks are grouped into zones such that all the tracks in one zone are adjacent to each other. The data rate at which data is written to or read from the disk is constant for all tracks within a zone and different for each zone. Because the disk is rotated at the same speed for all the zones, in order to take advantage of the greater recording area of the outer zones, the recording speed is increased for the outer zones on the disk.

The data to be stored on a disk is broken up into manageable portions called sectors. Multiple sectors are generally stored on each track. An example of a typical format of a sector is illustrated in FIG. 2. Each sector includes an ID field, a GAP field, a DATA field and a PAD field. The ID field is the unique identification tag for each sector in a track of a disk drive media and differentiates one sector from another. Within the ID field are four subfields, the ID PLO subfield, the ID AM subfield, the ID subfield and the CRC subfield. The ID PLO subfield is a multiple byte field of a known pattern which is used by the phase lock loop of the encoder/decoder (ENDEC) to synchronize to the incoming data stream. The ID AM subfield is a known pattern which is used by the drive controller to synchronize or align to the beginning of the ID subfield. This synchronization is necessary to align the disk controller to a data byte boundary, in order to differentiate each segment of data to a particular field. The ID subfield follows the ID AM subfield and contains the actual identification for the sector, including multiple bytes used to specify the address of the sector on the disk. The number of bytes within the ID subfield is at the discretion of the manufacturer of the disk drive and is controlled by the format of the particular disk drive used. The number of bytes within the ID subfield is the same for every sector and can comprise a cylinder high byte, a cylinder low byte, a sector number byte, a head number byte and a byte or two for defect management. The ID subfield is then followed by a fixed number of error detection bytes in the CRC subfield which are used to detect any errors in the ID field. Some formats, referred to as ID_Less formats, do not use an ID field, but rather use a header subfield within the DATA field.

The GAP field is a fixed number of bytes which are used to separate the ID field from the DATA field. The DATA field includes a DATA subfield and an error correction code (ECC) subfield. The DATA subfield is the portion of the sector where the actual data, which is communicated between the host computer and the disk drive, is stored. The ECC subfield is a fixed number of bytes tagged on to the end of the DATA subfield which are used to detect and correct soft or hard errors on the media within the capability of the code. This is necessary in order to avoid the transfer of erroneous data to and from the host computer.

An ID_Less sector format of the prior art is illustrated in FIG. 2b. In ID_Less formats, the ID field is replaced by a header subfield within the DATA field, thus combining the identification data and the DATA field into one field and reducing the number of bits necessary for each sector. The header subfield can be brought under the protection of the same ECC field as the DATA field and therefore afforded the same protection as the DATA field. The CRC field associated with the header subfield can be decreased or eliminated, further reducing the overhead of the system and eliminating the hardware which generates the CRC field. In ID_Less formats all of the information in the sector header may be predetermined by reading a small number of other sector headers on the track, usually one. The sync field or PLO field in an ID_Less format can be reduced in size or the reliability of the sync circuitry improved since the sync field will always occur immediately after a sector pulse.

The disk drive system performs three major operations: format, write and read. The disk drive can format the disk for storing data in the format supported by the system and the disk. The disk drive system also performs write operations to the disk to store data on the disk transmitted from the host computer to the disk drive system and read operations from the disk to read data from the disk and transmit it to the host computer. The disk is continuously rotating within the disk drive system, even as the read/write head moves between zones, which may cause the read/write head to cross over one or more servo fields as it travels from one track or zone to another track or zone. The controller circuit knows the angular position of the read/write head, but as the read/write head changes tracks between different zones, the number of sectors between servo marks changes, because of the change in bit density between zones. The controller does not know how to translate this angular position after a zone change into a known position on the track relative to the sectors and may be unable to determine the relative positioning of the sector pulses on the specific track. To re-orient itself on the disk, the hard disk controller will normally wait for the INDEX mark and orient itself from the INDEX mark for the track that it is on. However, waiting for the INDEX mark during a read or write operation increases the latency in reaching the next desired sector. This delay adds to the seek latency of the disk drive system.

DEFECTS

After a recording media is manufactured it is tested by the manufacturer to determine the validity of each sector. Defects may be introduced during the manufacturing process which will damage a sector and prevent data from being stored in or retrieved from that sector. Defects are flaws within the media, usually resulting from the presence of dust particles and other aberrations during the manufacturing process, that make a portion of the media, usually a single sector, unsuitable for the storage of information.

The number of defects on a disk increases as the storage capacity per unit area of the disk drive system increases. Therefore as the storage capability of the storage media is increased, it becomes more difficult and expensive to manufacture flawless storage devices. It also becomes cost prohibitive to discard all of the flawed devices. For these reasons it is desirable to develop a scheme which allows a system with defects occurring on its media to be saved and not discarded.

The manufacturer will identify the defective sectors which are detected after the manufacturing process in a list of defects, known as the "primary defect list" or "manufacturer's defect list." This list is stored directly on the disk in a reserved space, usually outside of the boundaries of the data tracks. Additional defective sectors, known as secondary or "grown" defects may be detected after the manufacturer's primary list has been compiled. A list of these "grown" defects are maintained and stored in a secondary defect list also on the disk in a reserved space.

The primary and secondary lists are read from the disk and stored in the random access memory (RAM) upon power up of the disk drive system. The system controller then uses the information from the primary and secondary lists to manage the defects and avoid writing data to bad or defective sectors.

LINEAR REPLACEMENT

Many different defect management schemes have been used in the past. Using the method of linear replacement for defect management the defective sectors are flagged and mapped to a good sector somewhere else on the disk, which is substituting for the defective sector, causing the system to jump from the defective sector to the good sector and then back to the defective sector in order to read or write the data on the disk in a consecutive order. This mapping technique adds considerable latency to the system and degrades its performance because of the required jumps from the defective sectors to the mapped substituting good sector and back. Each sector on a track is identified consecutively by a physical address or physical sector number, representing the actual location of the sector on the track. A logical sector number is used by the system controller to read data from and write data to the disk drive.

An example of a system using the method of linear replacement is illustrated in FIG. 3a. The first track includes one spare sector at the physical sector number 31 and has two defective sectors at the physical sector numbers 1 and 2. The first defective sector is flagged as a defective sector and is mapped to the spare sector at the physical sector number 31 which is labelled as the logical sector number 1. Because the spare sector on the first track has been used, the second defective sector at the physical sector number 2 is flagged as a defective sector that is mapped off the track. The physical sector number 2 is labelled as the logical sector number 2 and the system must travel to another track in order to read the data from or write the data to the sector which is substituting for the defective physical sector number 2 and then travel back to the first track in order to read or write the information in a consecutive order.

An associated mapping value accompanies the second defective sector to inform the system where the substituting sector is located on the disk. This associated mapping value can be found in a pointer within the ID field of the defective sector or can be found in a defect table which lists all of the defective sectors and their associated substituting sectors.

The disadvantage of the method of linear replacement is that it requires extra seeks to be performed by the system if the system is to read or write the data in a consecutive order corresponding to the logical sector numbers. For the system illustrated in FIG. 3a to read the data from the first track in a consecutive order corresponding to the logical sector numbers it will read the logical sector number 0 first. To read the logical sector number 1 the system must jump to the physical sector number 31. When the logical sector number 1 has been read the system must then jump back to the logical sector number 2, which is located at the physical sector number 2. Because the logical sector number 2 is defective the system is pointed to the substituting sector on another track and must travel to that sector in order to read the data in the logical sector number 2. After the logical sector number 2 has been read the system then must travel back to the first track and read the remainder of the logical sector numbers 3–30 in a consecutive order. This method adds many extra seeks to the system and thereby increases the latency of the system.

SECTOR SLIPPING

An improvement over the linear replacement technique is the method of sector slipping which also uses spare sectors assigned to each track to avoid the defective sectors, but does not require as many seeks to be performed by the system. Each sector on a track is identified consecutively by a physical address or physical sector number, representing the actual location of the sector on the track. The sectors are numbered from zero to N–1, consecutively from the INDEX mark, where N is the number of sectors on the track. The sectors on a track are also identified by a logical sector number corresponding to their position within the sequence of data stored on the track. The logical sector number is used by the controller to read data from and write data to the disk drive. Not every sector will be assigned a logical sector number.

A typical system employing sector slipping will include spare sectors at the end of each track. In a sector slipping scheme the defective sector is mapped to the next good sector on the track until all spare sectors are used. During formatting of the disk drive, logical sectors are assigned consecutively from a first sector on the track to the last sector, slipping defective sectors until all spare sectors on the track are used.

FIG. 3b illustrates a typical track having thirty two sectors, numbered zero through thirty one where the last sector of the track is a spare. In the track of FIG. 3b there are no defective sectors and therefore the spare sector 31 is not used. FIG. 3c illustrates a track with a defective sector at the physical sector number 2. As can be seen from FIG. 3c, the logical sector numbers are slipped after the defective sector and the spare sector is used as the logical sector number 30.

After the track has been formatted and the logical sectors are mapped out, the system then performs a calculation to determine the location of the target sector which it must read from or write to. In the case of FIG. 3c, if the system was instructed to read from a sector having a target logical sector number 26, the system would add the number of defects appearing before that sector, to that logical sector number to know the physical sector number of the target logical sector number. Therefore, because there is one defective sector before the physical sector number 26, the correct physical address for the target sector number 26 would be at the physical sector number 27.

When the number of defects on a track is greater than the number of spares assigned to that track, the defective sectors are still slipped, but as soon as the number of defective sectors exceeds the number of spares on the track, the remainder of the defective sectors are not slipped, but are mapped to a sector on another track or somewhere else on the disk using the linear replacement method as described above. A system using the sector slipping method which includes a track with more defective sectors than spare sectors is illustrated in FIG. 3d. The first track in FIG. 3d includes one spare sector and two defective sectors. The first defective sector at the physical sector number 1 is skipped and the logical sector number 1 is slipped to the physical sector number 2 of the first track. The second defective sector at the physical sector number 29 is not slipped because the spare sector on the track has already been used. The logical sector number 28 is therefore flagged as a defective sector and mapped to a substituting sector somewhere else on the disk, in this case the spare sector at the physical sector number 31 on the track 1.

The method of sector slipping maintains the logical sectors in a consecutive order allowing the system to read or write the data in a consecutive order without extra seeks. Extra seeks are required when the number of defective sectors on the track or segment exceed the number of spare sectors assigned to the track or segment and the system must travel to another track or segment to read or write the data from a substituting spare sector and then back to the original track.

CIRCULAR SLIPPING

Circular slipping or wrapping is another defect management method which can be used to map the defective sectors to substituting sectors. In the method of circular slipping or wrapping, the defective sectors are all slipped, even if the number of defective sectors exceed the number of spare sectors. If the number of defects on the track does exceed the number of spares, then the defective sectors are used as logical sectors to ensure that each track has a fixed number of logical sectors. The defective sectors which are used as logical sectors are flagged as defective and are mapped to a substituting sector somewhere else on the disk.

A system employing circular slipping is illustrated in FIG. 3e. The first track of FIG. 3e includes one spare sector and has two defective sectors. Both of the defective sectors are slipped and the spare sector 31 is used as the logical sector number 29. Because the system expects thirty one logical sectors per track, the first defective sector is used as the logical sector number 30. This sector is flagged as defective and is mapped to a substituting sector somewhere on the disk, in this case the spare sector at the physical sector number 31 on the track 1.

In the systems of the prior art which utilize sector slipping or circular slipping, the defect information and flags referred to above were included in the ID field. In drives that use an ID_Less format the ID field is eliminated, and in general the sector must be identified without reading any subfield of the sector. It is therefore desirable for a system to automatically generate the defect information and corresponding flags.

SEGMENT SLIPPING

A segment is a set of logically related tracks which are positioned adjacent to each other on the disk or media. The tracks within a segment are consecutively numbered from 0 to M. The physical sectors within a segment are consecutively numbered from 0 to SN−1, where SN is the number of physical sectors per segment, SL is the number of logical sectors per segment and P is the number of spare sectors per segment. Spare sectors are included at the end of a segment and defective sectors within a segment are slipped as described above for a track. The segment is treated as one contiguous storage space such that a defective sector is mapped to the next good sector within the segment and slipping occurs across the tracks within a segment. If the number of defective sectors for the segment exceeds the number of spare sectors included in the segment then the remainder of the defective sectors are mapped to substituting sectors somewhere else within the system. The concept of circular slipping can be applied to segment slipping, once the defective sectors within the segment exceed the spare sectors per segment, the remaining logical sectors are mapped to the defective sectors starting from the first defective sector within the segment. A special case of segment slipping is cylinder slipping where the segment is a cylinder of the disk.

A group of four tracks comprising a segment is illustrated in FIG. 5b. In the example of FIG. 5b, this segment or partition includes four tracks, each with thirty two physical sectors and two spare sectors at the end of the segment. A track base value TB for each track, specifies the beginning physical sector number PSN for the first sector of each track. A track displacement value TD includes the number of defective sectors in the tracks previous to the current track that were slipped across a track. The logical sectors are numbered consecutively throughout the segment, skipping the defective sectors. The first logical sector number of each track can be calculated by subtracting the track displacement value TD from the track base TB.

The first track in the example of FIG. 5b has a defective sector at the physical sector number 1. This defective sector is skipped and the physical sector number 2 is labelled as the logical sector number 1. The track displacement value TD for the second track is equal to one because of the one defective sector previous to the second track. The first logical sector number of the second track is therefore thirty one because the track base is thirty two and the track displacement value TD is one. The second track also includes a defective sector at the physical sector number 61. This defective sector is skipped and the physical sector number 62 is therefore labelled as the logical sector number 60. The track displacement value TD for the third track is equal to two because of the two defective sectors previous to the third track. Because the spare sectors are located at the end of the segment, the number of logical sectors and spare sectors on the last track of the segment must be appropriately adjusted based on the track displacement value TD and the number of spare sectors. For example, initially there are thirty logical sectors and two spare sectors on the last track of the segment illustrated in FIG. 5b. Because the track displacement value TD is not equal to zero, the number of logical sectors is increased by the track displacement value TD and the number of spare sectors SP is decreased by the track displacement value TD, using the following equation:

If SP≧TD then L=L+TD, SP=SP−TD else L=L+SP, SP=0

Automatic track processing requires hardware defect management and mapping the physical sector numbers on the track to logical sector numbers. This mapping of a physical sector number to a logical sector number must take into account the defect management strategy employed in the disk drive system and the skew, if any, of the system. A Logical Block Address (LBA) is a quantity which is kept for each non-defective sector and includes a cylinder number, a head or track number and a sector number. This LBA is translated to a Physical Block Address (PBA) which includes a cylinder, head and sector number. This translation is based on the assumption that there are a fixed number of logical sectors per track and/or segment.

One method which can be used to translate the LBA to a PBA, when the number of logical sectors per track is not constant, is based on the fact that the same address translation routine can be used if the target LBA is adjusted by the number of defective logical sectors with an LBA less than or equal to the target LBA that are slipped across the track. If there are no spare sectors used per track by the system then the adjustment will simply be the number of defective logical sectors with an LBA less than or equal to the target LBA. This translation method will require a table search. Other methods used for this translation will require extra seeks to perform the above translation if a segment slipping method is used.

SKEW

The skew of a system is a parameter which combines the head skew, the cylinder skew and the zone skew and represents the number of sectors that the system travels over as it changes from one cylinder or track to another or from one zone on the disk to another. For example, as the system travels from the end of one track to the beginning of a subsequent track, the system may travel over a number of sectors before it is ready to begin the operation for that track. The systems described above did not have a skew and began logically numbering the sectors from the INDEX mark. Disk drive systems which do have a skew value will begin the logical sector numbering of sectors on the track from the first sector at which the system is ready to begin the operation, which is not at the beginning of the track or the INDEX mark. These systems would then number the logical sectors consecutively, beginning from this sector and would continue numbering the sectors until this sector is again reached.

An example of this numbering system, taking into account the skew of a system, is illustrated in FIG. 4. The skew value of this system is five sectors and therefore the system begins logically numbering from the physical sector number 5. After taking into account the skew of the system, this system can then implement any one or a combination of all of the defect management schemes described above. When the system comes to the physical sector number 31, it is assigned a logical sector number 25. The system then wraps around to the beginning of the track and the next logical sector number on this track is the physical sector number 0 because of the skew of the system. Therefore, the physical sector number 0 is assigned a logical sector number 26. As the system jumps from this track to the next track, the skew of the system must again be taken into account and the first logical sector number of the next track will consequently be the physical sector number 10.

A system which uses an ID_Less format was taught by Greenberg et al. in U.S. Pat. No. 4,656,532 issued on Apr. 7, 1987. Under the method taught by Greenberg, the system, by reading a single header of a sector, can ascertain the location of the logical sectors on the track, as long as the number of defective sectors on the track is less than the number of defective sectors for which information can be stored in the header. If the number of defective sectors on the track exceeds the number of defective sectors for which information can be stored in the header, then more than one header will have to be used to ascertain the information for the track. The header includes the offset of the first logical sector on the track and the locations of the defective sectors on the track that must be skipped. The method of Greenberg translates the target logical sector number to a target physical sector number and counts the sector pulses until the target physical sector is reached. The method of Greenberg does not teach a translation algorithm for translation of the physical sector number to a logical sector number, and does not teach a method of translating physical to logical sector numbers and comparing the logical sector number with the target sector number for sector identification. The method of Greenberg et al. does not teach using a defect table in memory or using a first-in first-out (FIFO) stack for processing the track defects.

What is needed is a defect management method and apparatus which can be used with ID_Less formats, wherein the ID and DATA fields of a sector are merged. What is further needed is a method for automatic sector identification and track processing for disk drive systems which use the ID_Less format. What is also needed is a system which automatically supports the defect management schemes of the prior art without any real time intervention by the microprocessor in disk drive systems which use the ID_Less format.

SUMMARY OF THE INVENTION

Defect management for automatic track processing without an ID field, processes defect information for a track on a magnetic media within a disk drive system. A system which uses any method of defect management including linear replacement, sector slipping, cylinder slipping or segment slipping, can be supported. A physical sector number for each sector is translated to a logical sector number relating to the order of data on a track. This translation of the physical sector number to a logical sector number for automatic track processing can be accomplished using any one of three methods: 1) a track defect table can be built in the buffer RAM; 2) the defect information can be written in the header of every sector; or 3) a system FIFO, located in the onboard logic, can be used to manage the defect list. The first and third methods support an ID_less format wherein the data field does not contain a header subfield and information for sector identification is maintained by the disk drive system. In the second method, the header subfield comprises four defect records. In the third method, if there are more defect records for the track than will fit in the FIFO, then after initialization and loading the first and second banks of the FIFO by the drive microprocessor, the first and second banks are each loaded by the drive microprocessor while the other is being processed, in a ping-pong manner, until the track processing is complete. A defect record includes a physical sector number of the defective sector, an offset number and a flag indicating whether or not the defective sector has been slipped. The defect record may be either a fixed two byte entry or may be of a user defined number of bytes. Defect flags are automatically generated by the system for each defective sector.

BRIEF DESCRIPTION OF THE DRAWINGS

FIG. 3a illustrates a typical track within a system using the linear replacement method of defect management.

FIG. 3b illustrates a typical track having thirty two sectors, including one spare sector.

FIG. 3c illustrates a typical track including one slipped defective sector.

DETAILED DESCRIPTION OF THE PREFERRED EMBODIMENT

In previous systems, the defect information, including the mapping of defective sectors to replacement sectors was contained in the ID field of the sector. The apparatus and method of the present invention can be used with systems which include an ID field in the sector and can also be used with systems which use the ID_Less format without an ID field. The apparatus and method of the present invention can also support the defect management schemes of the prior art described above automatically without any real time intervention by the microprocessor in disk drive systems which use the ID_Less format. The apparatus and method of the present invention also automatically generates four flags, which will be described below, for each defective sector.

The present invention can implement any of the prior art methods described above for mapping the defective sectors to good sectors depending on the method used by the system. The method of the preferred embodiment of the present invention employs the method of circular slipping or segment slipping. In this method, the defective sectors are slipped using sector slipping until the number of defective sectors on the track or segment exceeds the number of spares assigned to that track or segment. The number of spares assigned to the track or segment can be chosen to minimize the number of tracks or segments for which the number of defects will exceed the number of spares. When the number of spares has been exceeded by the number of defects on the track or segment, the method of the present invention will assign the sectors that would have been shifted out to the defective sectors on the track or segment, beginning with the first defective sector and continuing until the last defective sector on the track or segment. From the defective sector, this logical sector is then mapped to a substituting spare sector somewhere else on the disk.

By using the circular slipping method the number of logical sectors per track or segment can be kept constant. When the number of spare sectors on the track or segment is exceeded by the number of defective sectors, the system does not have to travel back to the original track but can travel directly to the next subsequent track. The system will have to perform extra seeks to read or write the data in a consecutive order corresponding to the logical sector numbers. However, by using this method the system will save a seek over the other methods because when the last logical sector is read or written to, the system does not have to travel back to the original track but can travel directly to the next subsequent track.

Figure 5A:
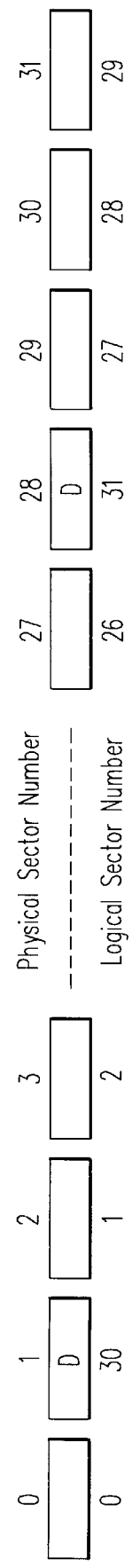
FIG. 5a illustrates an example of a track with one spare sector and two defective sectors.
Figure 5B:
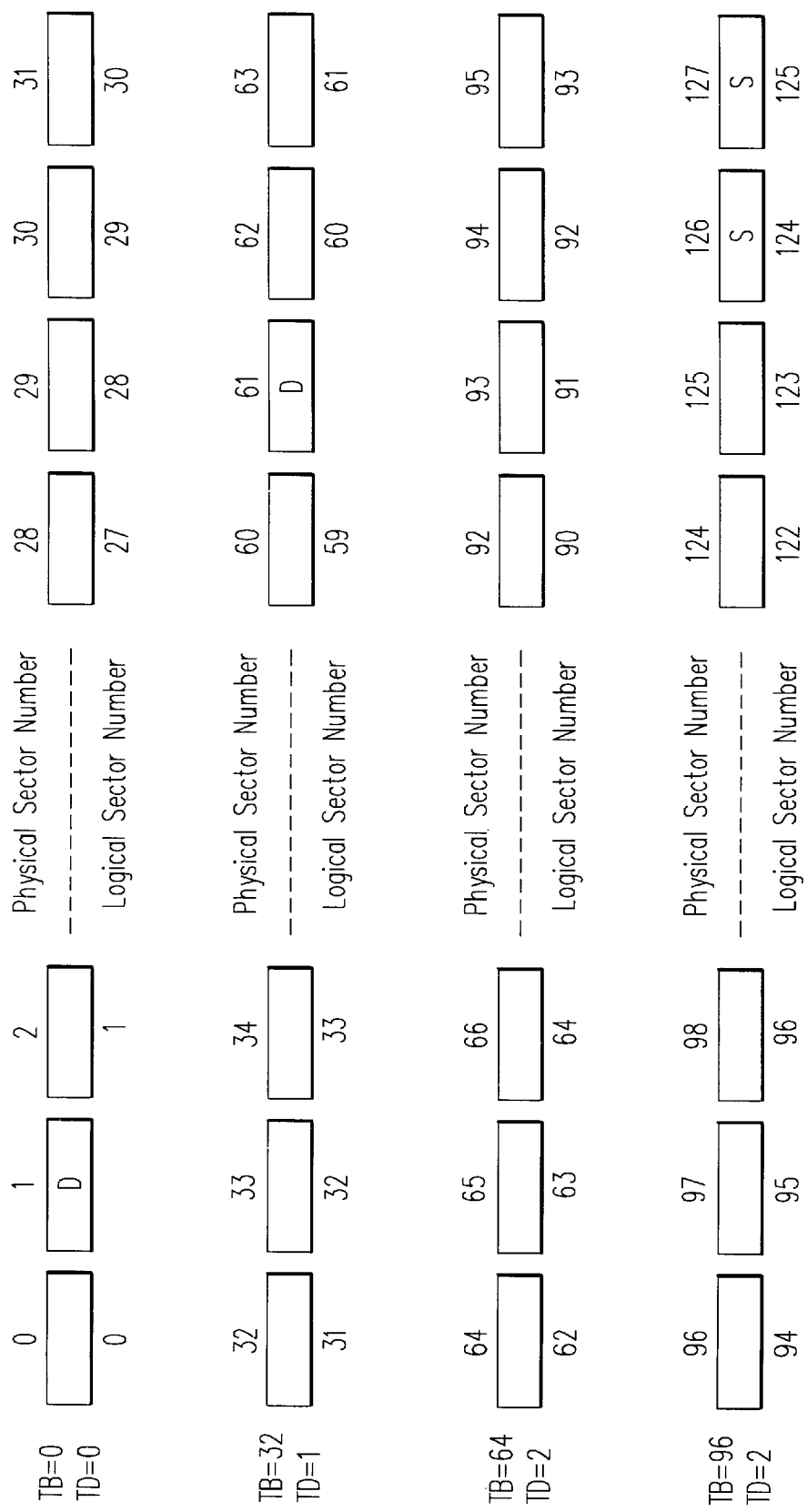
FIG. 5b illustrates an example of a cylinder slipping method for a cylinder including four tracks.

FIG. 5a illustrates an example of a track where the number of defective sectors exceeds the number of spares assigned to that track. The track of FIG. 5a has one spare assigned to it and two defective sectors. The track has thirty one logical sectors and one spare sector. The physical sector numbers 1 and 28 are defective and are slipped, as is illustrated in FIG. 5a. To keep the number of logical sectors on each track constant, the logical sector number 30 is assigned to the first defective sector, the physical sector number 1. The logical sector number 30 must be flagged as defective and additional information must also be kept so that the system will know the location of the spare substituting sector where this sector is mapped to on the disk.

An offset value is kept for each defective sector and is used to inform the system where the substituting sector for the defective sector can be found. The offset value is a user defined value and is programmed according to the defect management scheme employed by the system. The offset value is a pointer which will inform the system where the substituting sector is on the disk.

MAPPING WHEN SYSTEM SKEW IS EQUAL TO ZERO

The defect information of the track includes an ordered list, based on an increasing defect physical sector number, wherein the entry for each defective sector includes a physical sector number, an associated offset value and a binary valued flag SLIPPED, which indicates whether the sector has been slipped. In an embodiment of the present invention, a hexadecimal value of FF is not a valid defect sector number or a valid physical or logical sector number and is a default value used to signal an invalid logical sector number. Alternatively, a Not Valid Logical Sector Flag NVLSN is used to signal an invalid logical sector number.

The associated offset value is user defined, and is used for mapping the defective sectors to alternate sectors. Since the apparatus of the present invention uses the offset value as described below in detail, the user defined offset value must conform to these restrictions. When the SLIPPED flag is at a logical low voltage level, then a non-zero offset value less than or equal to the number of spare sectors per track indicates that the substituting sector is a spare sector on the same track. When the SLIPPED flag is at a logical low voltage level then a non-zero offset value greater than the number of spare sectors per track indicates that the alternate sector is not on the same track. When the SLIPPED flag is set to a logical high voltage level, a non-zero offset value indicates that the defective sector is mapped to a logical sector which is not on the track. The defective spare sectors are included in the list of defect records, however the offset value for a defective spare sector should be zero. When the flag SLIPPED is set to a logical high voltage level, this indicates that the defective sector is slipped. When the flag SLIPPED is reset to a logical low voltage level, this indicates that the defective sector is not slipped.

The number of spare sectors per track is kept in a register SP. The number of sectors per physical track is stored in the register N and the number of logical sectors per track is stored in the register L. The values SP, N and L are not embedded in the defect information on the track but are initialized by the apparatus of the present invention for each zone.

The apparatus of the present invention keeps track of the physical sector number and based on the track defect information, maps the physical sector number to a logical sector number. The apparatus of the present invention also keeps track of and automatically generates four flags, a DEFECT flag, a LOGICAL END OF TRACK (LEOT) flag, a PHYSICAL END OF TRACK (PEOT) flag and a TARGET SECTOR NOT ON TRACK (TSNOT) flag. Alternatively, an additional flag is generated by the apparatus of the present invention if the Not Valid Logical Sector Flag NVLSN is used to signal an invalid logical sector number, rather than assigning a hexadecimal value of FF to the logical sector number. The DEFECT flag, when set to a logical high voltage level, indicates that the defective sector is mapped to a spare sector off of the track.

Mapping of the physical sector number to a logical sector number requires the apparatus of the present invention to scan the track defect information and compute the number of defective sectors on the track that are slipped, represented by the value SD, the logical sector number of the last logical sector on the track, represented by the value X, the logical sector number of the last good sector on the track, represented by the value Z, and the logical sector number of the defective sectors on the track that are skipped and mapped to the spare sectors on the track. The first logical sector number that is skipped and mapped to a spare sector on the track is represented by the value SKIP1_LSN. The second logical sector number that is skipped and mapped to a spare sector on the track is represented by the value SKIP2_LSN. A hexadecimal value of FF for the values SKIP1_LSN and SKIP2_LSN indicates that there was no defective sector on the track that was skipped and mapped to a spare sector on the track. Note that the hexadecimal value of FF for the values SKIP1_LSN and SKIP2_LSN does not indicate that the spare sectors were not used because defective sectors on other tracks could have been mapped to the spare sectors on the current track.

The logical sector number of the last good sector on the track Z and the logical sector number of the last logical sector on the track X are computed using the following equations:

$$Z = (N-1) - SD \quad (2)$$

$$X = (L-1) \text{ If } SP \geq SD, \text{ Else } X = Z \quad (3)$$

Using the above equations for the track illustrated in FIG. 5a, the number of sectors per physical track N is equal to thirty two, and the number of defective sectors on the track that are slipped SD is equal to two. The logical sector number of the last good sector on the track Z is therefore equal to twenty nine. The number of spare sectors per track SP is equal to one and is therefore not greater than the number of defective sectors on the track that are slipped SD. The logical sector number of the last logical sector on the track X is therefore equal to the logical sector number of the last good sector on the track Z, which is equal to twenty nine.

The apparatus of the present invention begins its computations for a track by initializing the number of defective sectors on the track that are slipped SD to zero, the logical sector number of the first defective sector on the track SKIP1_LSN to the hexadecimal value FF, the logical sector number of the second defective sector on the track SKIP2_LSN to the hexadecimal value FF, the logical sector number of the last logical sector on the track X to the number of logical sectors per track L minus one and the logical sector number of the last good sector on the track Z to the number of sectors per physical track N minus one. A value of one is subtracted from the previous values because the system of the present invention begins numbering the sectors, both logically and physically, from zero. Alternatively, the sectors on each track could be numbered beginning from one and then the value of one would not have to be subtracted from the previous values.

The apparatus of the present invention will next scan the defect information for the track and the entry in the defect list for each defective sector of the track. If the defect sector number DSN is not equal to a hexadecimal value of FF and if the SLIPPED flag is equal to a logical high voltage level, then the apparatus will increment the number of defective sectors on the track that are slipped SD and the logical sector number of the last good sector on the track Z is decremented. Otherwise, if the defect sector number DSN is equal to a hexadecimal value of FF or if the SLIPPED flag is not equal to a logical high voltage level, and the offset value OFFSET is equal to a value of one or two, signalling that one of the spare sectors was used for this defective sector, then the logical sector number associated with the defective sector number DSN is saved in one of the registers SKIP1_LSN or SKIP2_LSN. The apparatus of the present invention repeats this process for all of the defective sectors on the track. When the apparatus of the present invention finishes these calculations for the defective sectors on the track, if the logical sector number of the last good sector on the track Z is less than the number of sectors for the logical track L minus one, then the logical sector number of the last logical sector on the track X is set equal to the logical sector number of the last good sector on the track Z.

After the apparatus of the present invention computes the values for the logical sector number of the last logical sector on the track X, the logical sector number of the first defective sector on the track mapped to a spare sector on the same track SKIP1_LSN and the logical sector number of the second defective sector on the track mapped to a spare sector on the same track SKIP2_LSN, it then goes through the track sector by sector and assigns the logical sector numbers to the sectors on the track. The logical sector number for the first and second defective sectors mapped to spare sectors on the same track are stored in the registers SKIP1_LSN and SKIP2_LSN. A value of FF within one of the registers SKIP1_LSN and SKIP2_LSN will indicate that there is no valid logical sector number for the defective sector stored in the respective register. Alternatively, two flags SKIP1_USED and SKIP2_USED are used to indicate whether the data within the registers SKIP1_LSN and SKIP2_LSN is valid for a defective sector.

If a physical sector number PSN is not a defect sector number DSN, then the corresponding logical sector number LSN is equal to the physical sector number PSN minus the number of slipped defective sectors between the physical sector number 0 and the physical sector number PSN. Otherwise, if the physical sector number PSN is a defect sector number DSN, then the sector is wrapped and the corresponding logical sector number LSN is equal to the logical sector number of the last logical sector on the track X plus the number of slipped defective sectors between the physical sector number 0 and the current physical sector number PSN.

MAPPING WHEN SYSTEM SKEW IS NOT EQUAL TO ZERO

In the previous discussion the system skew was assumed to be equal to zero. However, for practical application, additional calculations need to be performed before the physical sector numbers can be mapped to logical sector numbers, in order to handle the more general case of a non-zero skew. With a non-zero skew the physical sector number PSN is first mapped to a skew adjusted physical sector number F(PSN) prior to mapping to a corresponding logical sector number LSN. The skew adjusted physical sector number F(PSN) is calculated using the following equation:

$$F(PSN)=PSN-SKEW \text{ if } PSN \geq SKEW, \text{ Else } N+PSN-SKEW \quad (4)$$

Figures 1, 2A, 2B:
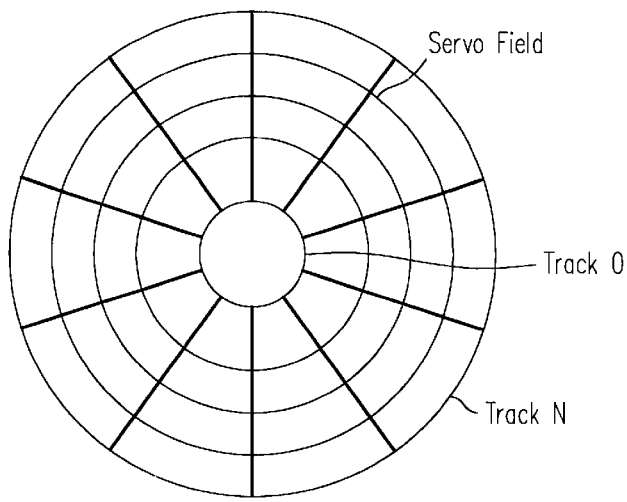
FIG. 1 illustrates a magnetic media platter with embedded servo fields.
FIG. 2a illustrates the format of a typical sector.
FIG. 2b illustrates the format of an ID_Less sector of the prior art.
Figure 3D:
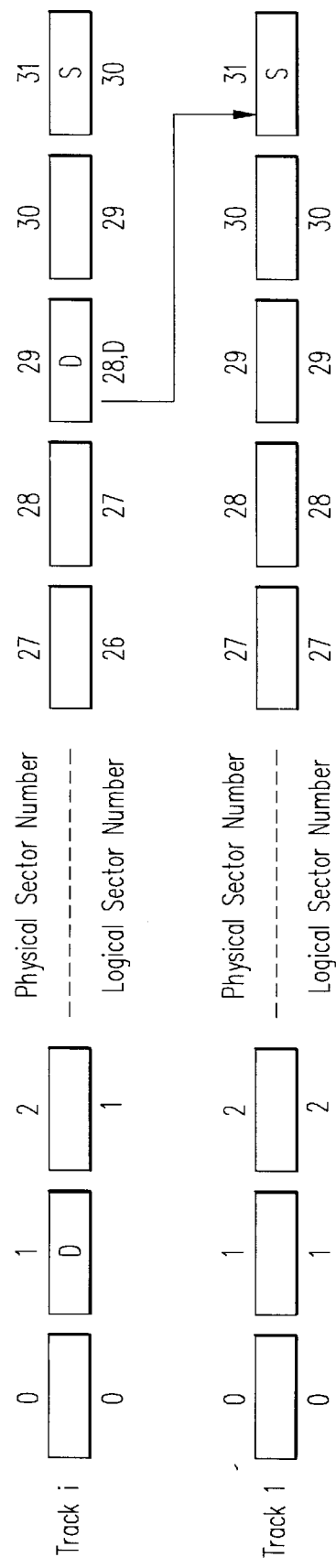
FIG. 3d illustrates a system using a sector slipping method of defect management.
Figure 3E:
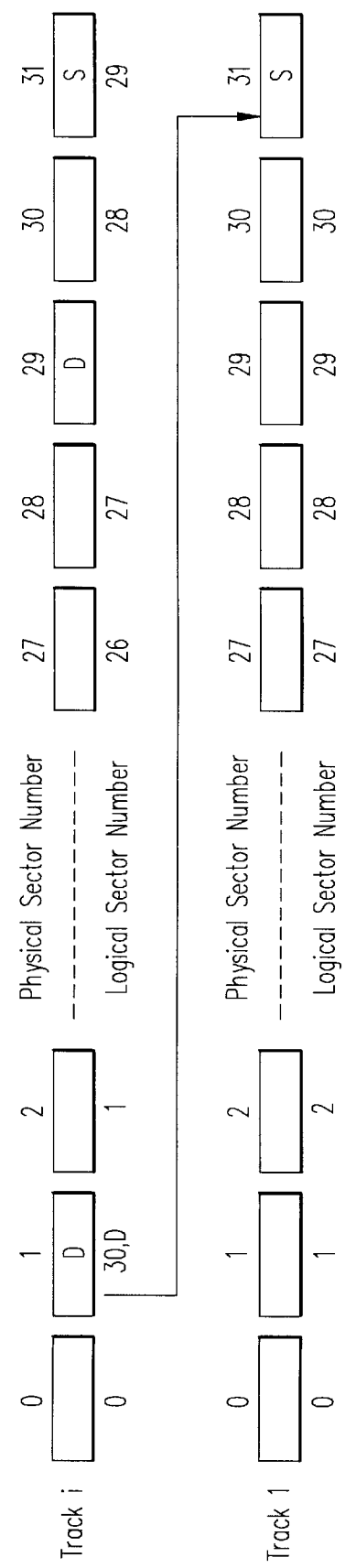
FIG. 3e illustrates a system using a circular slipping method of defect management.
Figure 4:
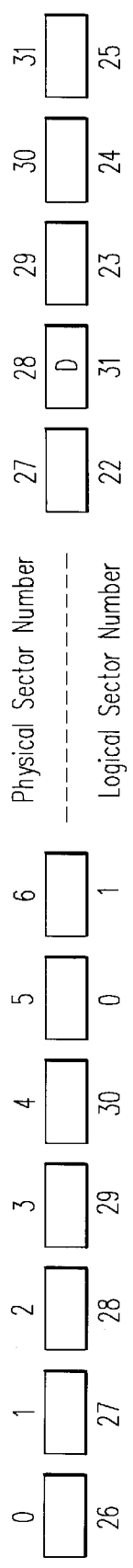
FIG. 4 illustrates a track within a system having a skew value of five sectors.

The value N in equation 4 is equal to the number of sectors per physical track. FIG. 4 which was discussed above can be used to illustrate the above calculations. If the skew of the system is equal to five, then the skewed physical sector number F(PSN) for any of the sectors after the physical sector number 4 is equal to the physical sector number minus five, the skew of the system and the skewed physical sector number F(PSN) for any of the sectors before the physical sector number 5 is equal to the number of sectors for the physical track N, which in this case is thirty two, plus the physical sector number minus five, the skew of the system. The skewed physical sector number F(PSN) for the physical sector number 29 would be equal to 24. The skewed physical sector number F(PSN) for the physical sector number 2 would be equal to 29.

To calculate the logical sector number LSN from the skewed physical sector number F(PSN) the following equations are used for a physical sector number which is not equal to a defective sector number DSN:

$$\text{IF } PSN<SKEW \text{ then } LSN=N+PSN-SKEW-bx; \quad (5)$$

where bx=b+c2

$$\text{IF } PSN \geq SKEW \text{ then } LSN=PSN-SKEW-bx; \quad (6)$$

where bx=b−c1

For a physical sector number which is equal to a defective sector number which is slipped:

$$\text{If } PSN<SKEW \text{ then } LSN=X+bx \quad (7)$$

where bx=b+c2

$$\text{If } PSN \geq SKEW \text{ then } LSN=X+bx \quad (8)$$

where bx=b−c1

In the above equations, the value b is equal to the number of defective sectors between the physical sector number 0 and the physical sector number PSN. The value c1 is equal to the number of defective sectors between the physical sector number 0 and the physical sector number corresponding to the skew of the system. The value c2 is equal to the number of defective sectors between the physical sector number corresponding to the skew of the system and the physical sector number corresponding to the number of sectors per physical track N.

In the track illustrated in FIG. 4, having a skew equal to five, the value of c1 is equal to zero because there are no defective sectors between the physical sector number 0 and the physical sector number corresponding to the skew of the system, in this example the physical sector number 4. The value of c2 is equal to one because there is one defective sector between the physical sector number 4 and the physical sector number corresponding to the number of sectors per physical track N, in this example the physical sector number 31. For physical sector numbers greater than twenty eight, the value of b is equal to one and for physical sector numbers less than twenty eight, the value of b is equal to zero. Therefore, the logical sector number LSN corresponding to the physical sector number 29, using the equation (6) is equal to twenty three, because the physical sector number 29 minus the skew, five, minus the value of bx, in this case one, is equal to twenty three. The logical sector number LSN corresponding to the physical sector number 2, using the equation (5) is equal to twenty eight, because the number of physical sectors on the track N, thirty two, plus the physical sector number 2, minus the skew, five, minus the value of bx, in this case one, is equal to twenty eight.

If the physical sector number is a defective sector which was slipped then the physical sector number is mapped to a logical sector number LSN using the equations (7) and (8), and adding the logical sector number of the last logical sector on the track X to the value bx. For the defective sector of FIG. 4 which has a physical sector number 28, it is assigned a logical sector number 31.

GENERAL DESCRIPTION OF THE METHODS OF TRANSLATION

Figure 9:
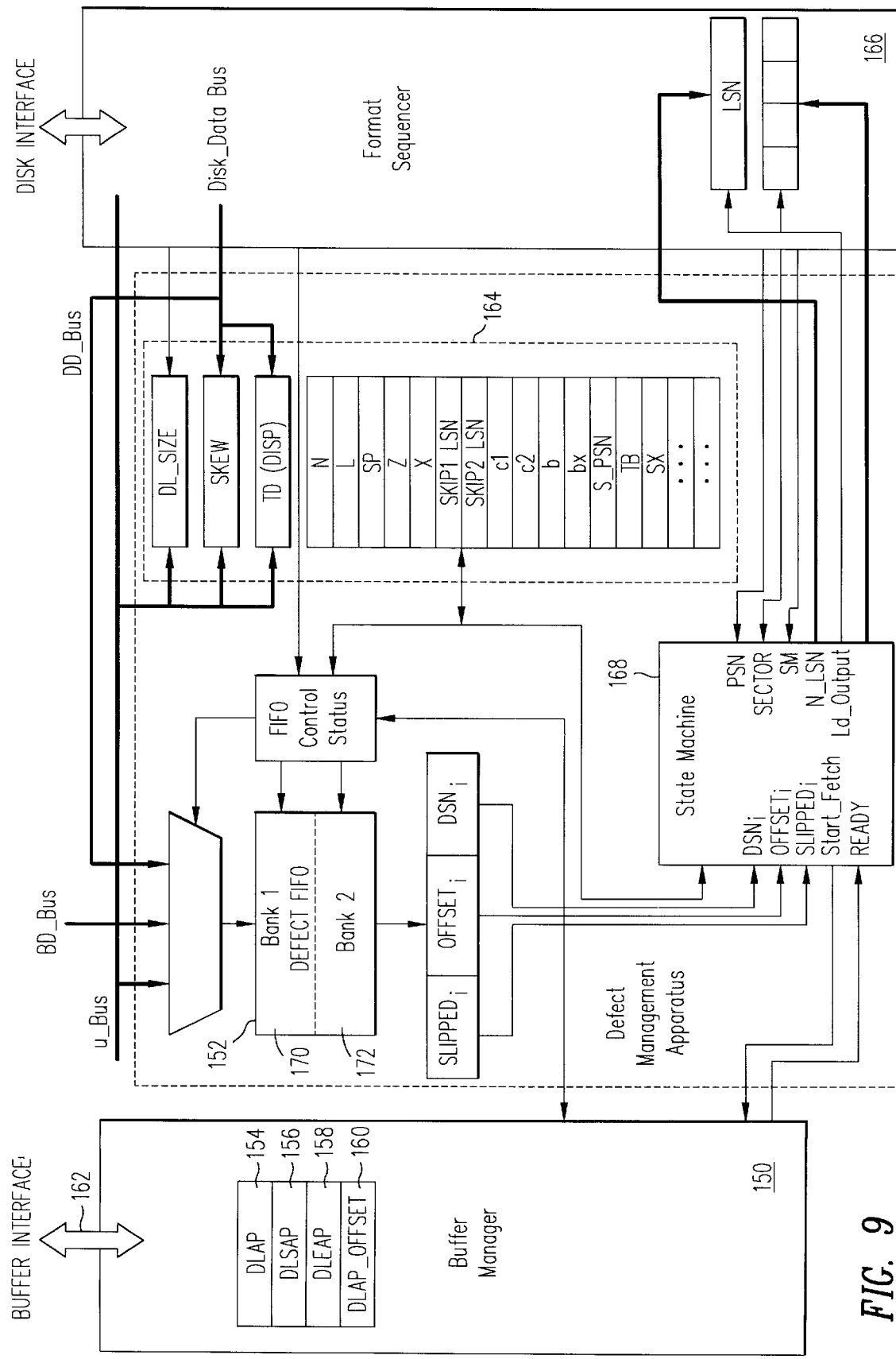
FIG. 9 illustrates a schematic block diagram of the apparatus of the present invention.

A schematic block diagram of the apparatus of the preferred embodiment of the present invention is illustrated in FIG. 9. The preferred embodiment of the method and apparatus of the present invention can use any one of three methods for translation of the physical sector number to a logical sector number for automatic track processing in disk drive systems. The first method builds a track defect table in the buffer RAM of the system. The buffer manager 150 uses the buffer interface 162 to control the retrieval of the defect records from the track defect table and load them into the defect FIFO. The track defect table includes a defect record for every defective sector on the track. The defect record includes a physical sector number of the defective sector DSN, an offset number and a flag bit indicating whether or not the defective sector is slipped.

This defect list includes a two-byte or four-byte entry for each defective sector on the track. This defect list must be contiguous and can be located in any 64 Kbyte segment of the buffer. A defect list start address pointer DLSAP is stored in the register 156 and points to the starting address of the defect list within the buffer RAM. A defect list end address pointer DLEAP is stored in the register 158 and points to the ending address of the defect list within the buffer RAM. A three-byte defect list address pointer DLAP is stored in the register 154 and points to the current entry in the defect list. When the lower sixteen bits of the pointer DLAP is equal to the ending address pointer DLEAP, the lower sixteen bits of the pointer DLAP is automatically reloaded with the starting address pointer DLSAP. The remaining eight bits of the defect list address pointer DLAP is a segment selector which selects a segment within the buffer RAM. The size of the defect list is specified by the parameter DL_SIZE.

Figure 7:
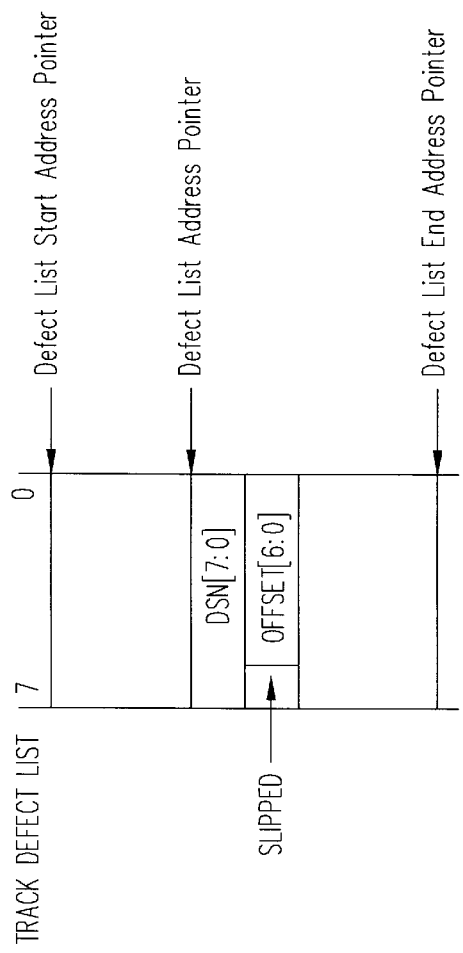
FIG. 7 illustrates a track defect list stored in the buffer RAM.

A track defect list is illustrated in FIG. 7. Each defective sector on the track has a corresponding entry in the defect list which includes an eight-bit defect sector number DSN, a seven bit offset value and a flag SLIPPED, wherein the flag SLIPPED is stored in the most significant bit of the second byte of the defect record. Alternatively, the defect sector number DSN could be a two-byte value and the offset value could be a fifteen-bit value, with the flag SLIPPED stored in the most significant bit of the second word of the defect record.

The second method embeds the defect information for the track within the header subfield of each sector. The defect information includes an ordered list of n defect records, based on an increasing defect sector number DSN. If a defect record is not used it is assigned a hexadecimal value of FF, indicating that it is not a valid defect record. To begin processing the defect information for a track it is only necessary to read a single header field on the track and load the track defect information into the FIFO 152.

When an ID_Less format including the header subfield is being used, the defect information for each track can be written into the header of each sector, directly on the track. This defect information, in the preferred embodiment of the present invention, includes an ordered list of four records, each record comprising a defect sector number DSN, which is the physical sector number of the defect, an associated offset value and a flag SLIPPED. The ordering of the list of four records is based on an increasing defect sector number DSN and as with the operation described above, a hexadecimal value of FF is not a valid defect sector number DSN.

The associated offset information is defined, and used for mapping the defective sectors to alternate sectors. Additionally, a FLAG byte is included in the header which contains a flag bit indicating that there are more than four defect records for this track. In the case when there are more than four defect records for the track, the system cannot process anything automatically and must use the microprocessor assisted method or store the defect list in the buffer RAM.

Figure 8:
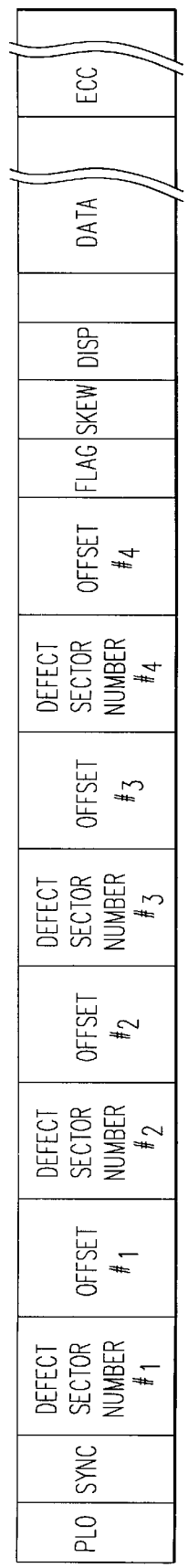
FIG. 8 illustrates a header sector for a system using an ID_LESS format, including four defect pairs.

The format of a sector with embedded defect information in the header is illustrated in FIG. 8. The sector comprises three subfields, including a header subfield, a DATA subfield and an ECC subfield. The header subfield contains a defect list of four defect records, a flag byte, optionally a displacement value, a skew value, a head number value and an error detecting CRC subfield. The programmable ECC subfield covering the header and DATA subfields also can be split to accommodate a servo mark in the preferred embodiment of the invention. Alternatively, the offset information could be removed from the header, and all defective sectors assumed to be slipped.

The third method includes the onboard first-in first-out stack FIFO 152 having a first bank BANK1 170 and a second bank BANK2 172 which are used as a ping-pong storage for the defect records. The microprocessor will fill the FIFO with track defect records if the number of defect records will fit in the FIFO. Otherwise, the microprocessor fills one of the banks while the other bank is being processed. Since the sector processing by the system will take more time than filling the FIFO, the microprocessor intervention time is negligible and if a reasonable sized FIFO is used, not time critical.

This information can be loaded into the FIFO by the microprocessor. The internal FIFO 152 consists of two banks which are used in a ping-pong manner. After the setup computation, if the number of defect records will not fit in the FIFO, the microprocessor loads both banks with defect information and the microprocessor sets both a flag BANK1_READY and a flag BANK2_READY to a logical high voltage level, loads other parameters and instructs the apparatus of the present invention that it can begin-the operation.

Each bank within the FIFO 152 of the preferred embodiment can hold four entries from the defect list at any one time. To begin the automatic processing for the current track, the first four entries from the defect list for the track are loaded into the first bank. If there are more than four entries, the next four entries are loaded into the second bank. The microprocessor manages the loading of the banks but the computations are done by the hardware of the present invention. After the defect list in the first bank is processed, the flag BANK1_READY is reset to a logical low voltage level and an interrupt is sent to the microprocessor. When the microprocessor receives the interrupt, it initiates the load into the first bank if there are more than eight entries in the defect list for this track.

The microprocessor and the hardware of the present invention then continue this operation, processing the entries in one bank, while the other bank is being loaded, until the operation is completed.

Figure 11:
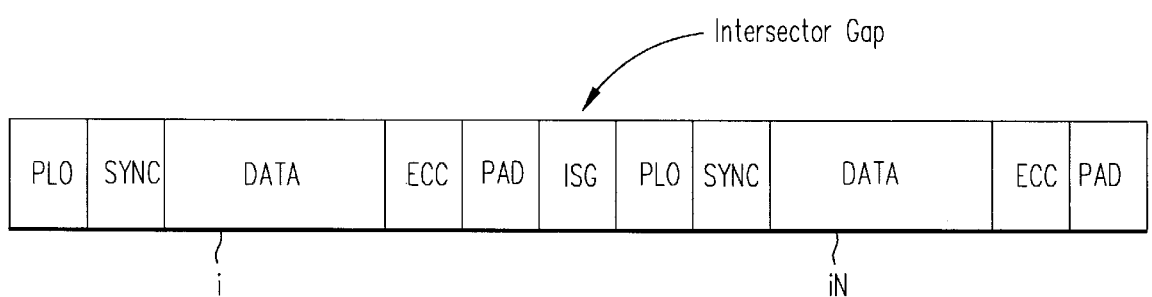
FIG. 11 illustrates a format of two consecutive ID_Less sectors without a header subfield.

The first method which maintains a track defect table within the buffer RAM and the third method which uses a FIFO to store the defect records, both support an ID_Less format with no header subfield. In both of these methods a header subfield is not necessary because any information required for sector identification is maintained somewhere else within the disk drive system. Two consecutive ID_Less sectors without a header subfield are illustrated in FIG. 11. Each of the other subfields included in a typical ID_Less format sector are included in the ID_Less format sectors without a header subfield illustrated in FIG. 11. An intersector gap (ISG) follows the first sector i and precedes the second sector i+1.

DESCRIPTION OF THE ALGORITHM OF THE PRESENT INVENTION

Figure 6A:
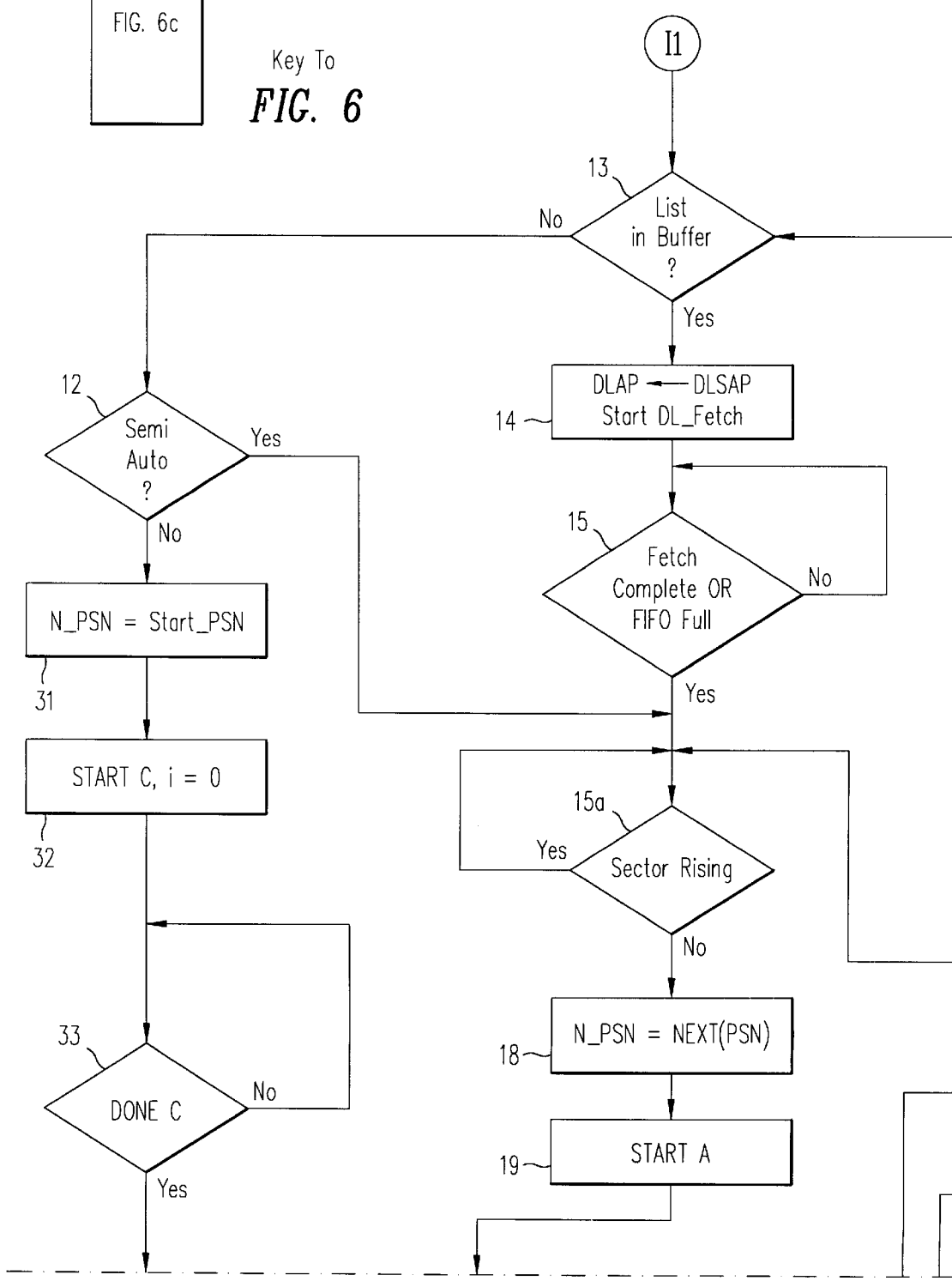
FIG. 6 illustrates a flow chart of the main program of the present invention.
Figure 6B:
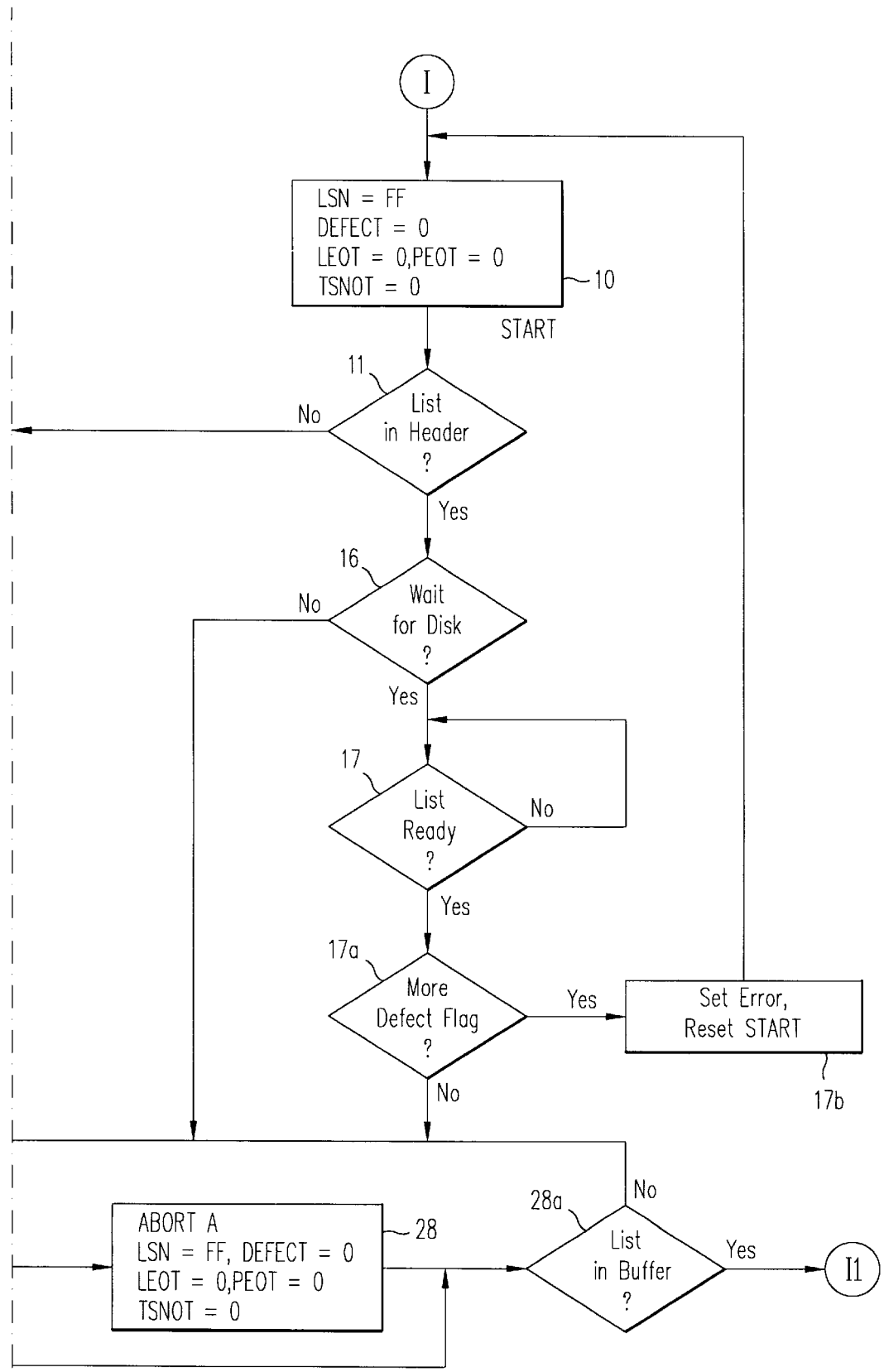
Figure 6C:
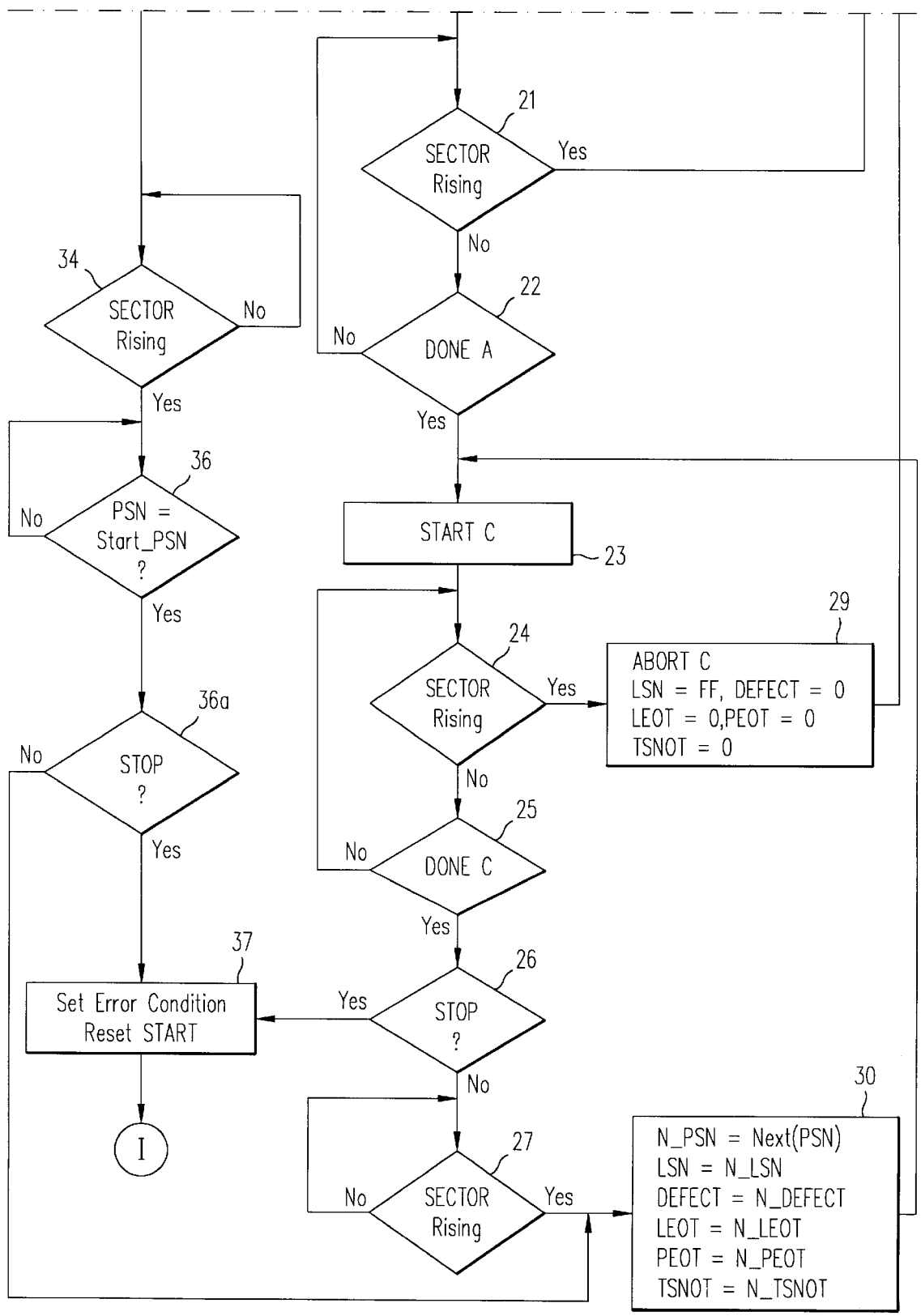

A flow chart illustrating the method of the present invention is illustrated in FIG. 6. The default values for the registers and flags are set in the Block 10. The logical sector number LSN is set to a hexadecimal value of FF, the DEFECT flag, the logical end of track flag LEOT, the physical end of track flag PEOT and the target sector not on track flag TSNOT are all reset to a logical low voltage level. The DEFECT flag is generated for a defective sector that is mapped to a spare sector off of the current track. The logical end of track flag LEOT is generated for a sector which is the last logical sector on the track. The physical end of track flag PEOT is generated for a sector which is the last physical sector on the track. The target sector not on track flag TSNOT is generated when the logical sector number of the target sector TARGET_LSN is greater than the logical sector number of the last logical sector on the track.

After the default values are set, the apparatus of the present invention then determines if the defect list is stored in the headers of the sectors at the Block 11. If the defect list is stored in the header then the apparatus of the present invention determines if it is to wait for the apparatus of the present invention to read the defect list from a header at the Block 16. If the apparatus of the present invention has already read the defect list from the header and has the defect list loaded, it then jumps to the Block 15*a* and begins processing the defect information for the track. If the apparatus of the present invention is to wait while the defect list is read and does not yet have the defect list loaded, then it waits at the Block 17 until the defect list is ready. Once the defect list is ready, the apparatus proceeds to the Block 17*a* where it determines if the more defect flag for the sector is set to a logical high voltage level signalling that the number of defects has exceeded the number of records available in the defect list. If the apparatus determines that the more defect flag is set to a logical high voltage level then an error is signalled and the signal START is reset to a logical low voltage level at the Block 17*b* and the apparatus returns to the Block 10 to begin the algorithm again. If the more defect flag is not set to a logical high voltage level then the apparatus jumps to the Block 15*a*.

If the defect list is not stored in the header of each sector on the track, the apparatus then determines at the Block 13 if the defect list is stored in the buffer RAM. If the defect list is stored in the buffer RAM then the defect list address pointer DLAP is initialized with the address of the defect list starting address pointer DLSAP and the apparatus is instructed to begin the fetch of the records from the defect list stored in the buffer RAM at the Block 14. At the Block 15, the apparatus waits until the fetch of the entries in the defect list is complete or until the FIFO is full whichever occurs first. Once the fetch of all of the entries in the defect list is complete or the FIFO is full the apparatus then determines at the Block 15*a* if a sector mark rising pulse is detected. A sector mark rising pulse is generated when the rising edge of a sector mark is detected. If no sector mark rising pulse is detected the apparatus jumps to the Block 18 and begins processing the defect information for the track.

If the defect information is not stored in the header of each sector or in the buffer RAM, the apparatus then determines at the Block 12 if the defect list fits completely in the defect FIFO and that the microprocessor has loaded the defect list in the defect FIFO. If the defect list does not fit completely in the defect FIFO, then the operation mode control, set by the microprocessor, indicates that the defect list does not fit completely in the defect FIFO and the microprocessor will manage loading a first bank BANK1 of registers and a second bank of registers BANK2. A starting physical sector number START_PSN is loaded into the internal physical sector number register N_PSN at the Block 31. At the Block 32, the defect FIFO pointer i is reset to zero and a command is given by the onboard logic to begin a mapping subroutine C. The apparatus then waits until the subroutine C is complete at the Block 33 and it has received an asserted signal DONE_C. During the mapping subroutine C, the computations for physical to logical mapping are performed, utilizing the spare sectors and taking into account the skew value for the system and the number of slipped defective sectors. Also during the subroutine C, the defect list is loaded in the first and second banks of the FIFO if it is determined that the defect list is not already loaded in the buffer RAM.

After the apparatus completes the mapping subroutine C, it then waits for a sector mark rising pulse at the Block 34. After the apparatus has detected a sector mark rising pulse, it then waits at the Block 36 until the physical sector number PSN is equal to the starting physical sector number START_PSN. As soon as the physical sector number PSN is equal to the starting physical sector number START_PSN, the apparatus determines at the Block 36*a* whether or not a stop command has been issued. If a stop command has not been issued the apparatus jumps to the Block 30, otherwise at the Block 37 an error condition flag is set to a logical high voltage level, the signal START is reset to a logical low voltage level and the apparatus jumps up to the Block 10.

If the apparatus determines at the Block 12 that the defect list fits completely in the defect FIFO and the microprocessor has loaded the defect list in the defect FIFO, it then jumps to the Block 15*a* to begin processing the defect information for the track. The apparatus determines at the Block 15*a* if a sector mark rising pulse is detected. If a sector mark rising pulse is detected the apparatus waits at the Block 15*a* until no sector mark rising pulse is detected and then proceeds to the Block 18. At the Block 18 the apparatus loads the next physical sector number NEXT(PSN) into the internal physical sector number register N_PSN. At the Block 19 the apparatus begins the subroutine A. During the subroutine A, the track defect information is scanned and the number of defective sectors on the track that are slipped, the logical sector number of the last logical sector on the track X, the logical sector number of the last good sector on the track Z and the logical sector number of the defective sectors on the track that are skipped and mapped to the spare sectors on the track SKIP1_LSN and SKIP2_LSN, the defective list address pointer offset DLAP_offset and the values k, c1, c2 and b are all calculated. A hexadecimal value of FF for the logical sector number of the defective sectors on the track that are skipped and mapped to the spare sectors on the track SKIP1_LSN and SKIP2_LSN indicates that there is not a defective sector on the track that was skipped and mapped to the spare sector on the track, but does not indicate that the spare sectors on the track were not used, because defective sectors from other tracks could have been mapped to the spare sectors on the track.

The defective list address pointer offset DLAP_offset is a pointer offset used when the defect list is stored in the buffer RAM. The value k represents the number of defect records already processed in the track defect list. The value c1 represents the number of defective sectors between the physical sector number 0 and the physical sector number corresponding to the skew of the system. The value c2 represents the number of defective sectors between the physical sector number corresponding to the skew of the system and the physical sector number corresponding to the number of sectors per physical track N. The value b represents the number of defective sectors between the physical sector number 0 and the physical sector number PSN.

While the apparatus of the present invention is executing the subroutine A it also checks for a sector mark rising pulse at the Block 21. If a sector mark rising pulse is detected before the apparatus completes the subroutine A, the apparatus aborts the execution of the subroutine A at the Block 28 and then determines at the Block 28*a* if the defect list is stored in the buffer RAM. If the defect list is stored in the buffer RAM the apparatus jumps back to the Block 13, otherwise it jumps back up to the Block 15*a*. Also at the Block 28 the logical sector number LSN is set to a hexadecimal value of FF, the DEFECT flag, the logical end of track flag LEOT, the physical end of track flag PEOT and the target sector not on track flag TSNOT are all reset to a logical low voltage level. The apparatus waits at the Block 22 until the completion of the subroutine A, as long as no sector mark rising pulse is detected before the subroutine A is finished.

After the subroutine A is completed the apparatus then begins the subroutine C at the Block 23. While the apparatus is executing the subroutine C it also checks for a sector mark rising pulse at the Block 24. If a sector mark rising pulse is detected before the apparatus completes the subroutine C, the apparatus aborts the execution of the subroutine C at the Block 29 and jumps back up to the Block 28a. Also at the Block 29, the logical sector number LSN is set to a hexadecimal value of FF, and the DEFECT flag, the logical end of track flag LEOT, the physical end of track flag PEOT and the target sector not on track flag TSNOT are all reset to a logical low voltage level. The apparatus waits at the Block 25 until the completion of the subroutine C, as long as no sector mark rising pulse is detected before the subroutine C is finished.

After the completion of the subroutine C, the apparatus of the present invention determines at the Block 26 if it is to stop processing the defect information for this track. If the apparatus is to stop processing the defect information for this track, then an error condition flag is set to a logical high voltage level at the Block 37, the signal START is reset to a logical low voltage level and the apparatus jumps back up to the Block 10. If the apparatus determines that it is not to stop processing the defect information for this track, then it waits at the Block 27 for a sector mark rising pulse. After the apparatus has detected a sector mark rising pulse, it then completes the instructions at the Block 30 and jumps to the Block 23 and begins the subroutine C for the next sector.

At the Block 30, the next physical sector number NEXT (PSN) is loaded into the internal physical sector number register N_PSN, the value from the internal logical sector number register N_LSN is loaded into the logical sector number register LSN, the value of the internal defect flag N_DEFECT is stored in the defect flag DEFECT, the value of the internal logical end of track flag N_LEOT is stored in the logical end of track flag LEOT, the value of the internal physical end of track flag N_PEOT is stored in the physical end of track flag PEOT and the internal target sector not on track flag N_TSNOT is stored in the target sector not on track flag TSNOT for processing by the Format Sequencer 166. The apparatus of the present invention always performs the calculations for the sector ahead of where the apparatus actually is on the disk. The results of these calculations are stored in the internal registers and flags denoted by an N before them and when a sector mark rising pulse is detected, the values of the internal registers and flags are loaded into the apparatus registers and flags for that sector and the apparatus then begins performing the calculations for the next sector, always one ahead of its actual position.

While only the functions of the subroutines A and C have been described above and a detailed description has not been included, it will be apparent to those skilled in the art that the implementation of these functions may be achieved in numerous ways by someone skilled in the art, with a specific implementation depending upon the overall system configuration.

ALTERNATE EMBODIMENT

Figure 10:
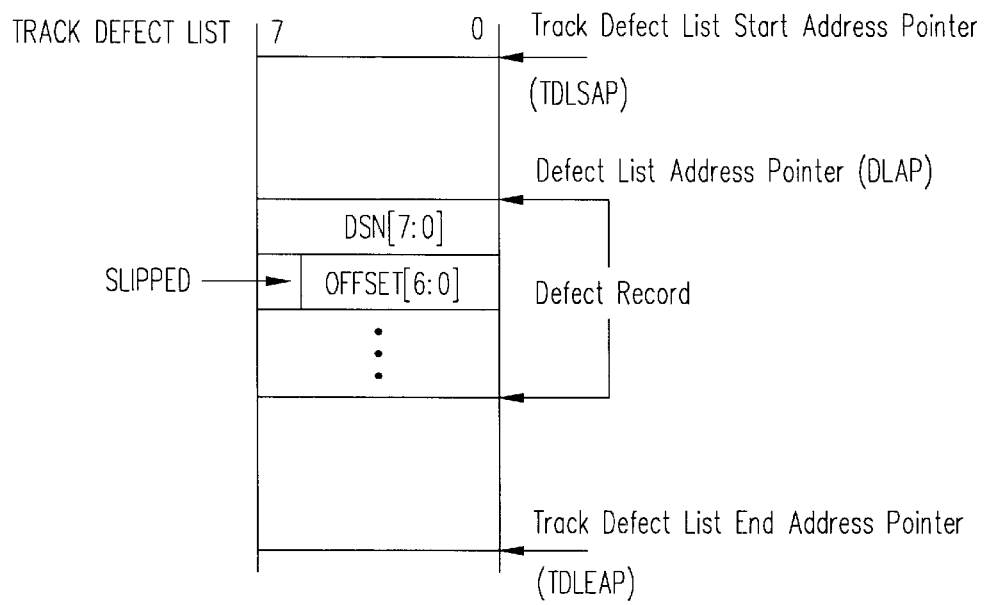
FIG. 10 illustrates an alternative track defect list including a programmable number of bytes for each record.

In the embodiment described above, the size of the defect record per entry in the defect list was fixed at two bytes. In an alternate embodiment of the present invention, the number of bytes contained in the defect record may be defined by the user. When the defect list is in the buffer, the Defect Management Apparatus will automatically process the defect list from the buffer. The track defect list illustrated in FIG. 10 is contiguous and located in any 64K segment of the buffer. A track defect list start address pointer TDLSAP signals the beginning of the track defect list in the buffer. A track defect list end address pointer TDLEAP signals the end of the track defect list in the buffer. The track defect list start address pointer TDLSAP and the track defect list end address pointer TDLEAP correspond to the pointers DLSAP and DLEAP discussed above.

The user will define the size of the defect record per entry in the parameter REC_SIZE. As stated above, the value stored in the register DL_SIZE specifies the number of entries in the track defect list. Each entry in the track defect list includes a first byte, Byte 0, specifying the defect sector number (DSN), a second byte, Byte 1, specifying the offset value OFFSET and the value of the flag SLIPPED and optional bytes 2 through n which specify optional user defined flags, where n equals the defect record size. The optional user defined bytes are skipped over automatically by the Buffer Manager 150.

The Defect Management Apparatus keeps track of the physical sector number PSN and based on the track skew and the defect list information, will map the physical sector number PSN to a logical sector number LSN. The Defect Management Apparatus also keeps track of the flag DEFECT, the target sector not on track flag TSNOT, the logical end of track flag LEOT and the physical end of track flag PEOT. As described above, a hexadecimal value FF is not a valid physical sector number PSN or logical sector number LSN. This limitation may be eliminated by including a not valid logical sector number flag NVLSN, as described above, instead of assigning a hexadecimal value FF to the logical sector number LSN of an invalid sector. Thus, for an invalid logical sector number LSN, the not valid logical sector number flag NVLSN will be asserted.

In the preferred embodiment, described above, the values stored in the registers SKIP1_LSN and SKIP2_LSN were calculated in the subroutine A, representing the first and second defective sectors mapped to spare sectors on the same track. A value of FF within one of the registers SKIP1_LSN and SKIP2_LSN will indicate that there is no valid logical sector number for the defective sector stored in the respective register. Alternatively, instead of storing the value FF in the registers SKIP1_LSN and SKIP2_LSN, a logical zero value may be assigned to the flags SKIP1_used and SKIP2_used during the subroutine A, indicating that there is no valid logical sector number stored in the corresponding register. Then, in the subroutine C, when a first skipped sector or a second skipped sector is encountered, the appropriate values SKIP1_LSN or SKIP2_LSN will be calculated and the appropriate flag SKIP1_used or SKIP2_used will be set to a logical one value. This alternative method is advantageous because there are no extra computational steps required in the subroutine A or the subroutine C in order to calculate the values SKIP1_LSN and SKIP2_LSN. However, until a skipped defective sector is encountered, the not valid logical sector number flag NVLSN for the spare sectors is asserted which results in an extra revolution of the disk before the spare sector is identified as an alternate sector for a skipped defective sector. This will not cause any performance degradation in the system unless the first target sector on the track is a skipped defective sector that is mapped to a spare sector on the track.

In the preferred embodiment of the present invention, the number of skipped defective sectors for a track is limited to two. In systems which have more than two spare sectors per track, the apparatus of the preferred embodiment will flag any subsequent defective sector on a track, after the second defective sector, as defective. For such a subsequent defective sector the DEFECT flag will still be set even though the defective sector may be mapped to a spare sector on the same track. Alternatively, additional registers are used to store the logical sector number of these subsequent defective sectors that are skipped and mapped to the additional spare sectors on the track. In systems with more than two spare sectors per track, the number of registers used to store the logical sector numbers of the defective sectors can be set equal to the number of spares on each track. Also, if necessary, additional flags may be used to indicate that there is no valid logical sector number stored in a corresponding register.

In the preferred embodiment, as described above, the logical end of track flag LEOT is set to a logical high voltage level for a sector which has a logical sector number LSN equal to the logical sector number of the last logical sector on the track X. Alternatively, a programmable mode select value LEOT_Mode may be programmed to select when the logical end of track flag LEOT is generated. If the programmable mode select value LEOT_Mode is programmed to a logical low voltage level then the logical end of track flag LEOT is generated when the logical sector number LSN is equal to the logical sector number of the last logical sector on the track X. If the programmable mode select value LEOT_Mode is programmed to a logical high voltage level, then the logical end of track flag LEOT is generated when the logical sector number LSN is equal to one less than the number of logical sectors on the track L (L−1).

The present invention has been described in terms of specific embodiments incorporating details to facilitate the understanding of the principles of construction and operation of the invention. Such reference herein to specific embodiments and details thereof is not intended to limit the scope of the claims appended hereto. It will be apparent to those skilled in the art that modifications may be made in the embodiment chosen for illustration without departing from the spirit and scope of the invention. Specifically, it will be apparent to one of ordinary skill in the art that the method of the present invention could be implemented in many different ways and the apparatus disclosed above is only illustrative of the preferred embodiment of the present invention.

We claim:

1. A method of performing an operation to a target logical sector in a storage device having multiple media surfaces rotating in unison and a plurality of transducers carried by an actuator for movement in unison into read/write alignment with respective data tracks on the media surfaces, each data track comprising a alignment with respective data tracks on the media surfaces, each data track comprising a plurality of physical sectors, wherein the data tracks are accessed by the transducers when the actuator is at a given position from a cylinder, the method comprising the steps of:

generating a track defect list comprising a physical sector defect record for each of a set of defective physical sectors, the set of defective physical sectors being comprised in the plurality of physical sectors, the physical sector defect records comprising defect management information for the defective physical sectors, the step of generating the track defect list comprising the step of generating defect management information according to one of a plurality of predetermined defect management schemes comprising at least a sector slipping method and circular slipping methods;

storing the track defect list in a memory circuit, the memory circuit storing a plurality of the physical sector defect records;

translating a physical sector number to a logical address according to the track defect list stored in the random access memory circuit by retrieving the sector defect records into a FIFO from the random access memory circuit and processing the track defects records retrieved into the FIFO;

comparing the logical address to the target logical sector to determine whether the physical sector number corresponds to the target logical sector; and synchronizing with a sync field of the target logical sector and performing the operation.

2. A method of performing an operation to a target logical sector in a storage device having multiple media surfaces rotating in unison and a plurality of transducers carried by an actuator for movement in unison into read/write alignment with respective data tracks on the media surfaces, each of the data tracks comprising a plurality of physical sectors, wherein the data tracks are accessed by the transducers when the actuator is at a given position from a cylinder, the method comprising the steps of:

generating a track defect list comprising a physical sector defect record for each of a set of defective physical sectors, the set of defective physical sectors being comprised in the plurality of physical sectors, the physical sector defect records comprising an ID field for each of the set of defective sectors, the ID field comprising at least a present physical sector identification and an identity of defective physical sectors to be skipped, the step of generating a track defect list comprising the step of generating defect management information according to one of a plurality of predetermined defect management schemes comprising at least a sector slipping method and circular slipping methods;

storing at least a plurality of the physical sector defect records in a memory circuit by providing a random access memory for storing the track defect list;

reading from the memory circuit the ID field corresponding to a physical sector;

translating a physical sector address location to a logical address according to the ID field read in the step of reading from the memory circuit by retrieving the sector defect records into a FIFO from the random access memory and processing the sector defect records retrieved into the FIFO;

comparing the logical address to the target logical sector to determine whether the physical sector location corresponds to the target logical sector; and synchronizing with a sync field of the target sector and performing the operation.

3. A method of performing an operation to a target logical sector in a storage device having multiple media surfaces rotating in unison and a plurality of transducers carried by an actuator for movement in unison into read/write alignment with respective data tracks on the media surfaces, each of the data tracks comprising a plurality of physical sectors, wherein the data tracks are accessed by the transducers when the actuator is at a given position from a cylinder, the method comprising the steps of:

generating a track defect list comprising a physical sector defect record for each of a set of defective physical sectors, the set of defective physical sectors being comprised in the plurality of physical sectors, the physical sector defect records comprising an ID field for each of the set of defective sectors, the ID field comprising at least a present physical sector identification and an identity of defective physical sectors to be skipped, the step of generating a track defect list comprising the step of generating defect management information according to one of a plurality of predetermined defect management schemes comprising at least a sector slipping method and a circular slipping method;

storing at least a plurality of the physical sector defect records in a memory circuit by providing a random access memory for storing the track defect list and by providing the plurality of sectors for storing the track defect list;

reading from the memory circuit the ID field corresponding to a physical sector;

translating a physical sector address location to a logical address according to the ID field read in the step of reading from the memory circuit by:

retrieving the sector defect records into a ping-pong FIFO from the plurality of sectors, wherein the ping-pong FIFO comprises at least a first bank and a second bank for receiving the sector defect records, and wherein a micro-processor loads the sector defect records alternately into the first and second banks; and processing the sector defect records retrieved into the FIFO;

comparing the logical address to the target logical sector to determine whether the physical sector location corresponds to the target logical sector; and synchronizing with a sync field of the target sector and performing the operation.

* * * * *